US006341312B1

(12) United States Patent
French et al.

(10) Patent No.: US 6,341,312 B1
(45) Date of Patent: Jan. 22, 2002

(54) CREATING AND MANAGING PERSISTENT CONNECTIONS

(75) Inventors: Steven Michael French; Thomas Frank Peebles, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/213,326

(22) Filed: Dec. 16, 1998

(51) Int. Cl.[7] ............................................... G06F 13/00
(52) U.S. Cl. ........................ 709/227; 709/217; 709/225
(58) Field of Search ................................. 709/217, 219, 709/223, 225, 227, 229, 230, 237, 318, 327, 329

(56) References Cited

U.S. PATENT DOCUMENTS

| 5,027,269 A | | 6/1991 | Grant et al. ................. 364/200 |
|---|---|---|---|
| 5,598,536 A | * | 1/1997 | Slaughter, III et al. ..... 709/219 |
| 5,754,830 A | | 5/1998 | Butts et al. .................. 395/500 |
| 5,796,393 A | | 8/1998 | MacNaughton et al. ..... 345/329 |
| 5,867,661 A | * | 2/1999 | Bittinger et al. ............ 709/227 |
| 5,944,824 A | * | 8/1999 | He .............................. 713/201 |
| 6,212,565 B1 | * | 4/2001 | Gupta ......................... 709/229 |

* cited by examiner

Primary Examiner—Viet D. Vu
(74) Attorney, Agent, or Firm—Duke W. Yee; Jeffrey S. LaBaw; Michael R. Nichols (57) ABSTRACT

Persistent network connections created by the inventive mechanism survive logoff and persist across logon. A persistent connection is created when a network connection is established (or when an existing connection is modified) using a simple command line or GUI interface. Information supplied via the interface enables the mechanism to establish, dynamically, a different security context for each given persistent connection, and this security context is "flexible" in that it may differ from the user's logon id and password. If a user were currently authenticated for a given persistent network connection before a network failure, the user, upon connect, is allowed access to the network connection without requiring further authentication.

21 Claims, 2 Drawing Sheets

CREATING AND MANAGING PERSISTENT CONNECTIONS

This application contains subject matter protected by copyright. All rights reserved.

BACKGROUND OF THE INVENTION

1. Technical Field

The present invention relates generally to network connection management and, in particular, to a flexible procedure for creating and managing persistent, secure connections to network directories and devices from a personal computer.

2. Description of the Related Art

It is known in the prior art to extend a network file system using a redirector. A known software redirector is the Server Message Block ("SMB") (a/k/a the Common Internet File System or ("CIFS")) redirector, which allows a user at a client machine to access various network devices located on servers in the network. Typically, such devices are of four (4) distinct types: file directories or drives, printers, modem/serial ports, and interprocess communication mechanisms (e.g., a named pipe). A user normally attaches to a given network network device after he or she logons to the network; conversely, the user normally detaches from a connected network device upon logoff, or upon logon as a different user.

In this conventional client-server network environment, certain key programs, such as persistent "services" and programmatic logon routines, typically cannot be located on network-attached drives. This is because logoff (as well as logon) on most or all network operating systems destroys all existing network connections (namely, the connections to network-attached drives, printers, named pipes and modems). In particular, logoff causes these programs to trap or fail, as the dynamic load libraries (dlls) and executable (.exe) files that are needed disappear with the lost network connection.

It is known in the art to provide so-called "persistent" connections in a network environment. Thus, for example, a remotely-booted computer (which may be diskless) often sets up a boot drive (e.g., via the IBM RIPL facility) as a persistent connection. This facility maintains a simple a security context (e.g., typically, the machine name) but does not "remember" the user's logon data. Likewise, known network operating systems (e.g., Novell Netware) provide an anonymous persistent connection for accessing a logon program. Like the previous example, however, this technique does not provide a flexible security context. A "security context" generally refers to that information which is necessary to authenticate a user to a server. In a simple case, it may include a userid and password. In more complex schemes, a security context may include or be defined by certificates (obtained through public key security techniques), tickets, information provided through a key exchange, or the like.

Moreover, such known approaches do not address persistent connections in the context of intermittent, transient network problems, i.e. problems that do not necessarily sever the network connection but that might otherwise interfere with it at some lower level signaling. Further, the existing state-of-the-art does not address persistent connection management in a simple and flexible manner, nor does it provide support for all four (4) types of network attached devices, namely, drives, printers, modems and named pipes.

The present invention addresses these needs.

BRIEF SUMMARY OF THE INVENTION

A network redirector is enhanced according to the present invention to provide a persistent connection management scheme exhibiting flexible security contexts, transparent reconnection upon transient network interruptions, simple setup and connection management, and support for all common network device types.

Persistent network connections created by the inventive mechanism survive logoff and persist across logon. A persistent connection is created when a network connection is established (or when an existing connection is modified) using a simple command line or GUI interface. Information supplied via the interface enables the mechanism to establish, dynamically, a different security context for each given persistent connection, and this security context is "flexible" in that it may differ from the user's logon id and password.

According to the invention, when a given connection to a network device is identified in a given manner as being persistent (e.g., by the setting of a "permanent" flag), several advantageous connectivity functions are provided. First, if the connection to the attached network device is severed, the invention reconnects that connection automatically with the appropriate security context. When the device becomes available, the user is not required to re-enter his or her userid and password, or to logon again. Second, if the connection to the attached device is interrupted transiently (but not severed), user is reconnected to the network device transparently (i.e. without requiring the user to take any action). Finally, where the user initiates standard logoff processing (that would otherwise unmount the device), the network connection is intentionally bypassed to prevent disconnection.

Preferably, the inventive mechanism is implemented within or as an adjunct to a network redirector supported on a client machine in a network. The client machine has a processor for executing an operating system having a network redirector or support for a redirection mechanism.

The foregoing has outlined some of the more pertinent objects and features of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the Preferred Embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION OF THE PREFERRED EMBODIMENT

Figure 1:
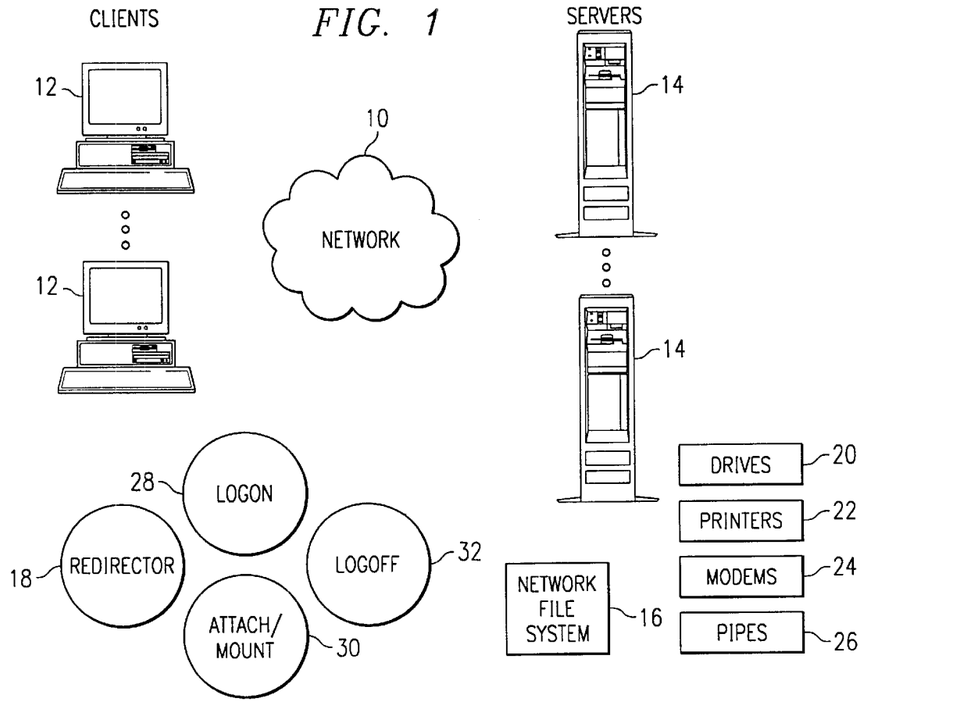
FIG. 1 is a simplified block diagram of a client-server network in which the present invention is implemented.

The present invention is implemented in a computer network 10 such as illustrated in FIG. 1. In this network, a plurality of clients 12 are connected to one or more servers 14. Each client is a personal computer or a diskless network computer. A given server preferably supports an operating system, such as IBM® OS/2® Warp™ Server Version 4.0. As is well-known, OS/2 Warp Server provides an application server foundation with integrated file and print sharing, backup and recovery services, remote business connections systems management, advanced printing, and Internet access. A given client machine has a processor that executes an operating system and various application programs. A representative client machine is a personal computer that is x86-, PowerPC®-, 68000- or RISC-based, that includes an operating system such as IBM® OS/2® Warp Client Version 4.0. Although the above operating systems are preferred, the present invention may be implemented on any network clients, including DOS, Windows 3.x, Windows NT Workstation, Windows for Workgroups and Windows '95.

As illustrated in FIG. 1, the client-server network includes a network file system 16, e.g., an SMB (CIFS) file system. Other network file system types include NFS (for UNIX) and the like. As is well-known, a network client typically has support for a redirector 18, which is software that allows a user at the client to access various network devices located on servers in the network. Typically, such devices are of four (4) distinct types: file directories or drives 20, printers 22, modem/serial ports 24, and interprocess communication ("IPC") mechanisms such as named pipes 26. A user normally attaches to or mounts a given network network device after he or she logons to the network through the logon process 28. Although the technique by which a network device is mounted is implementation-specific, typically this function is accomplished using a network device attachment/mount process 30. The attachment process, among other things, attaches the user to the network device by issuing to the server certain connection requests. Conversely, the user normally detaches from a connected network device upon logoff, or upon logon as a different user. A logoff process 32 is used to demount network devices, typically by issuing to the redirector 18 certain disconnection requests.

Figure 2:
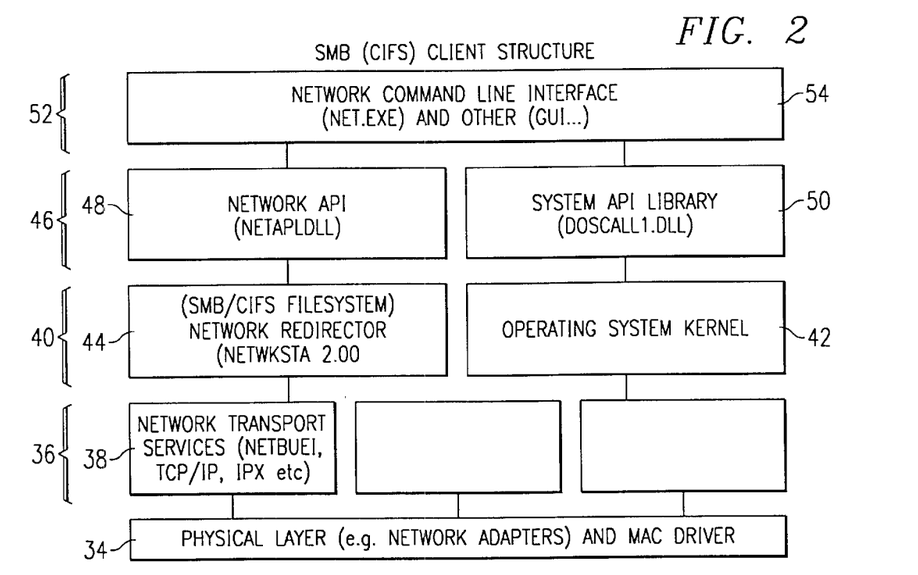
FIG. 2 is a block diagram of an SMB (CIFS) client structure that supports the network redirector and the persistent connections mechanism of the present invention.

FIG. 2 illustrates a known SMB (CIFS) client structure that is enhanced according to the present invention. This structure conforms to a conventional seven (7) layer network operating system architecture. The bottom layer of the stack is the physical layer 34, comprising network adapters and MAC drivers. Moving upwards, the next layer 36 provides network transport services 38 (e.g., NETBEUI, TCP/IP, IPX, and the like). The next layer 40 includes the operating system kernel 42 together with the network redirector 44 (in this case, SMB/CIFS File System redirector (NETWKSTA.200)). The next layer 46 supports the network application programming interface (API) 48 (in this case, NETAPI.DLL) and the system API library 50 (in this case, DOSCALL1.DLL). The highest layer 52 is the network command line interface 54 (in this case, NET.EXE or some other graphical user interface).

According to the invention, the network API and command line utility are enhanced to add support for a "persistent connection" as a new device type modifier for network devices, namely, drives, printers, modems and named pipes. Moreover, a set of preferably standalone utilities is provided to manage the new connection type. The present invention also adds the ability to pass in a security context (userid/password to be used for the specific connection) to the API (or command line utility). Moreover, the invention enhances an exiting network drive reconnection logic to handle multiple security contexts. This allows transparent reconnection of network files and directories without loss of data in the event of temporary network failure of a transient, intermittent nature. Further, the invention enhances the network client file system (i.e. the redirector) to handle the new device type, multiple security contexts, and an internal interface to manage these constructs.

NET USE is an existing command that is used to attach a user to a network device. It is also supported in Windows '95, Windows '98 and Windows NT clients. According to the present invention, the new "persistent connection" device type modifier is specified via the NET USE command line interface ("CLI"), although one of ordinary skill will appreciate that this specification may be effected using a GUI or any other command interface.

The syntax of this command (as modified according to the present invention) is as follows:

---

NET USE [device|\\machineID\netname][/PERM [SERVER]]
NET USE device\\machineID/netname[password][/COMM][/PERM]
NET USE device alias [password][/COMM][/DOMAIN:name]
NET USE {device|\\machineID\netname}/DELETE
    NET USE connects a requester to shared resources, disconnects a requester from shared resources, or displays information about network connections.
    Typing NET USE without options lists the requester's connections. The options of this command are:
NET USE

| | |
|---|---|
| alias | A name that has been assigned to a shared resource. |
| device | Assigns a name to connect to the resource. There are three kinds of devices: disk drives (A: through Z:), printer ports (LPT1: through LPT9:), and serial device ports (COM1: through COM9:). |
| \\machineID | Is the machine ID of the server controlling the shares resource. |
| \netname | Is the name of the shared resources, or netname. |
| password | Is the password for connecting to resources on a server running share-level security or on another domain where your user ID is defined with a different password. You can type an asterisk (*) instead of the password to be prompted for the password. The password will not be displayed when you type it. |
| /COMM | Specifies that an LPT device is to be connected to a serial device (non-spooled) queue. |
| /DOMAIN:name | Allows connection to an alias on a domain other than the logon domain. |
| /DELETE | Removes a network connection. |
| /PERM | Makes the connection permanent. The connection is not deleted by LOGOFF, but is deleted upon reboot. |
| /USER | Is the userid for connecting to resources on a server on another domain where you are defined with a different userid. This is only valid when used with the /PERM switch. |

---

Figure 3:
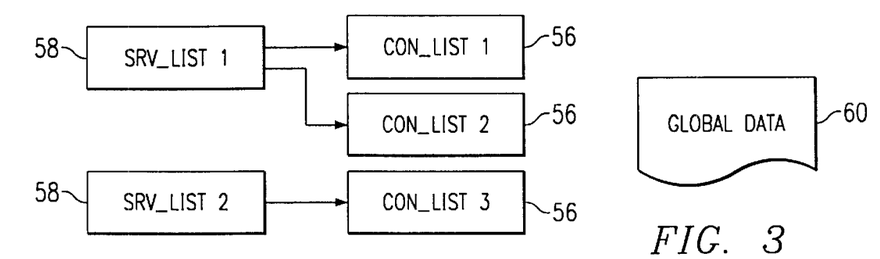
FIG. 3 is a block diagram of the internal data structures used in the redirector mechanism of the present invention.

Referring now to FIG. 3, a block diagram is illustrated of the structures that are preferably created by the present invention to manage the persistent connections. According to the invention, whenever a user mounts a network device using the NET USE CLI described above, a per remote resource connection structure 56 (called con__list) is created. In addition, a per server session structure 58 (called srv__list) is created for each server to which the user is connected. There is one resource connection structure 56 for each network device connection, but only one server session structure 58 per server, irrespective of the number of client resource connection structures. Thus, as illustrated in FIG. 3, connection structures con__list1 and con__list2 are associated with session structure srv__list1, while connection structure con__list3 is associated with session structure srv__list2. This example, of course, is merely exemplary. These structures are mirrored on various servers in the network. As also seen in FIG. 3, the internal redirector structures include a global data structure 60 including the userid and password as well as alternative security information. According to the present invention, if the user enters an alternative security context in the "password" field of the NET USE CLI interface, such information may be used in lieu of the logon userid and password when a persistent connection is otherwise processed according to the present invention. Such alternative security context information is stored in the per server session strucure 58 and facilitates the provision of persistent connections with a "flexible" security context.

Figure 4:
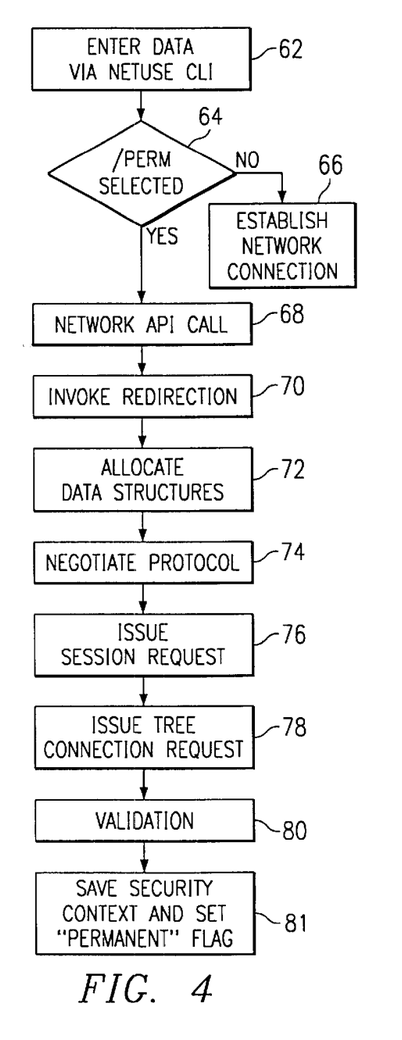
FIG. 4 is a simplified flowchart of a routine for setting up a persistent connection according to the present invention.

FIG. 4 is a flowchart of a routine for setting up and establishing a persistent connection according to the invention. The routine begins at step 62 with the user interactively entering the required information in the NET USE CLI. At step 64, a test is performed to determine whether the /PERM modifier was selected. If not, the routine branches to step 66 and establishes a connection to the network device without reference to the present invention. If the outcome of the test at step 64 is positive, the routine continues at step 68 by making a call from the network CLI to the network API. This call validates the syntax of the flags passed in from the NET USE CLI. At step 70, the network API invokes the network redirector. The routines then continues at step 72 to allocate the structures previously illustrated in FIG. 3. The connection structure (con__list) maintains state information about the network device, and the session structure maintains state information with respect to the server to which the user is connecting.

The routine then continues to begin the process of mounting the user to the network device. The following steps are typically implementation-specific. At step 74, the client's network transport services layer negotiates a protocol with the server. At step 76, the client stack issues a session establishment request. This request includes a security context (e.g., the logon userid and password, or some other security context entered via the NET USE CLI). Thereafter, at step 78, the client issues a tree connection request to the server to mount the network device. The server then validates the new network connection at step 80.

Validation typically involves having the server verify that it has a device corresponding to the selected name, that the device is valid and, optionally, that the user has permission to attach to the device. At step 81, the security context identified in the server's response (to the session establishment request) is stored in the session structure 58, and the connection is flagged as "permanent" in the resource connection structure 56. This completes the process.

Figure 5:
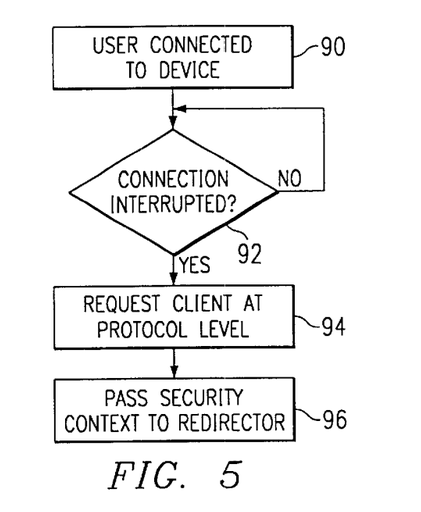
FIG. 5 is a simplified flowchart explaining how a user is transparently reconnected to a network device following an interruption on the connection.

FIG. 5 is a flowchart explaining how a user is transparently reconnected to a network device following an interruption of the network connection. The routine begins at step 90 with the user connected to the network device. At step 92, the routine tests to determine whether the network connection has been interrupted. For example, such an interruption may occur at just a lower level of the network connection protocol (as a result of a transient, intermittent condition). An interruption may occur across the entire connection, due to a power failure, server failure, or the like. If the outcome of the test at step 92 is negative, the routine cycles. If, however, the outcome of the test at step 92 is positive, the routine continues at step 94 to reconnect the client to the server at the required protocol level. At step 96, the routine passes to the redirector a security context that has been previously saved via the srv__list data structure. This enables the routine to reconnect without requiring the user to re-enter information defining that security context. Indeed, such reconnection is said to be "transparent" because it is effected without the user's awareness.

Figure 6:
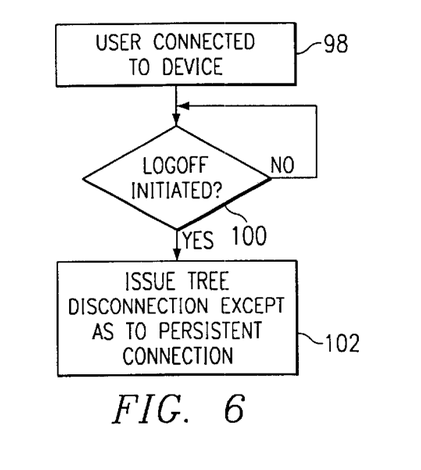
FIG. 6 is a flowchart illustrating how the present invention maintains persistent connection upon user logoff.

FIG. 6 is a flowchart illustrating how the present invention maintains persistent connection upon user logoff. The routine begins at step 98 with the user connected to the network device. At step 100, the routine tests to determine whether the user has initiated a logoff. If the outcome of the test at step 100 is negative, the routine cycles. If, however, the outcome of the test at step 100 is positive, the routine continues at step 102 to issue tree disconnection requests for demounting the network devices. Step 102, however, is not applied to the network connection that includes the /PERM flag setting. This, the connection is maintained.

Several extensions to the present invention are now described. Generally, the data structures identifying the persistent connections are stored in RAM in the client machine. One of ordinary skill will appreciate that these structures may be saved to disk such that when the machine is rebooted, the mechanism can reestablish the connections automatically prior to logon. In particular, the redirector reads the file and replays the connections with their appropriate security contexts.

Moreover, if desired, the CLI interface may require that the person seeking to add, delete or change a persistent connection evidence some local administrative authority prior to such operation.

The following is a representative data structure for the con__list data structure. The new /PERM flag is included:

```
/****CONNECT LIST
 *
 *    For each outstanding "use" or connection, one of
 *    these structures is allocated
 *
 */
struct    con__list {
          struct con__list        *con__next;       /* ptr to next connection */
          struct srv__list far    *con__pSrvLst;    /* ptr to srv__list for */
                                                    /* this connection */
          unsigned short          con__SerialNum;   /* con list Serial Number */
```

-continued

```
        unsigned short      con_ActiveCnt;          /* Num active references */
                                                    /*  to this connection. */
        unsigned short      con_DevUseCnt;          /* num explicit outstanding */
                                                    /* Device uses. */
        unsigned short      con_UseCnt;             /* Total implicit and */
                                                    /*  explicit Uses */
        unsigned short      con_flags;              /* Status/Control flags */
        unsigned short      con_DevType;            /* Device type (summary.api) */
                                                    /*  used by Toon Protocol */
        unsigned short      con_TreeId;             /* (SMB.Treeid) */
        struct SrchBuf far  *con₁.pSrchBuf;         /* chain of search buffer(s) */
        unsigned long       con_DormTime;           /* time con_list went dormant */
        char                con_Text[CONTXTLEN];    /* remote name */
        char                con_PassWd[PWLEN+1];    /* User Password */
        short               con_PassWdLen;          /* User Password Length */
        unsigned short      con_uid;                /* Validated uid ret by server */
        unsigned short      con_ThrdId;             /* Thread ID of CON_INIT */
        unsigned short      con_optsupp;            /* support optional search bit */
        char                con_fs_type[FSLEN+1];   /*  native fs of server share */
        unsigned short      con_flags2;             /* @d02a More Status/Control
flags */
};           /* con_list */
/* connect_flags bits */
#define CON_INVALID              0x0001             /* connection is invalid */
#define CON_WAITING              0x0002             /* proc(s) waiting on con_list */
#define CON_DISCONNECTED         0x0004             /* con_list disconnected */
#define CON_BADPW                0x0008             /* Once good password is now bad
*/
#define CON_ZOMBIE               0x0010             /* con list being blasted away */
#define CON_NEEDTDIS             0x0040             /* Dormant connection - needs
discon*/
#define CON_RIPL                 0x0080             /* It is a RIPL Connection */
#define CON_PERM                 0x0100             /* User-defined "permanent" */
                                                    /* Connection */
#define CON-DFS                  0x0200             /* "DFS" connection (reserved) */
#define CON_NEED_NULLOGOFF       0x1000             /* need null user log off */
#define CON_NULLUSR              0x4000             /* Null User Connection */
/****   WARNING: Numerical value of CON_NULLUSR *MUST* equal that of RTCB_NULLUSR
*    and SRV_NULLUSR
*/
#define CON_INIT                 0x8000             /* currently being initiated */
```

The following is a representative data structure for the srv_list data structure.

```
//****SRV_LIST
*
* Each session in the multiplexer has a srv_list
* entry. This structure is used to track the status
* of the session, the number of VCs in use, receives
* and receive requests on the session. Also
* maintained are the "NEGOTIATED" buffer limits on the
* given session, and the protocol being used.
*
*/ struct srv_list {
    struct srv_list     *srv_next;       /* pointer to next serv_list */
    unsigned short      srv_flags;       /* Status/Control flags */
    unsigned short      srv_RefCnt;      /* Num attached con_lists */
    unsigned short      srv_SerialNum;   /* srv_list Serial Number */
    unsigned short      srv_SBufLim;     /* Max # search structs that */
                                         /*    fit into the bufferSize */
    unsigned short      srv_MaxXmitS;    /* max read/write size */
                                         /*     min (server buf. size, */
                                         /*     redir buf. size) /*
    unsigned short      srv_Protocol;    /* Protocol version in use */
    unsigned short      srv_MaxWriteS;   /* max write size */
                                         /* (server buffer size) */
    unsigned short      srv_SecMode;     /* Server security mode. */
                                         /* rrrr rrrr rrrr rrES */
```

-continued

```
                                                  /*  r=reserved */
                                                  /*  S=1 - UserLevel security */
                                                  /*  E=1 - PassWd Encryption */
    unsigned short     srv_maxvcs;                /*  max. num of VCs
permitted */
    unsigned short     srv_OptSup;                /*  Optional support */
                                                  /*     Raw, Subdial, etc.
*/
    unsigned long      srv_SessKey;               /*  SMB session key.
Returned */
                                                  /*     by server in
NEGOTIATE */
    struct connect_list *srv_pConn;               /*  Ptr to con_list
struct(s) */
    char               srv_text[SRVTXTLEN+1];     /*  Asciiz remote
name */
    char               srv_dom_text[DNLEN+1];     /*  domain of
server */
    char               srv_os_ver[OSVERLEN+1];    /*  operating
sys. at server */
    char               srv_type[SRVTYPELEN+1];    /*  lan server
ver. of server */
    char               srv_pad;
    unsigned short     srv_NAThrd;                /*  ID of Thread doing
NoAck */
                                                  /*  (SRVTXTLEN+1=odd
number) */
    unsigned short     srv_NA_MPX;                /*  MPX entry of NoAck
Send */
    unsigned short     srv_pNBI;                  /*  pointer to net bios
info */
    unsigned short     srv_mpxvc_WaitCnt;         /*  # MPX requests
waiting */
                                                  /*  for RAW xfer
completion /*
    unsigned short     srv_mpxvc_AsyPend;         /*  Num outstanding Async
*/
                                                  /*  RA/WB NCBs */
    unsigned short     srv_mpxvc_NCBNeed;         /*  Num outstanding
requests */
    unsigned short     srv_mpxvc_NCBIntr;         /*  Outstanding
Interrupted */
                                                  /*  requests */
    unsigned short     srv_mpxvc_WantRawVC;       /*  Raw VC desired count
*/
    unsigned short     srv_mpxvc_LastWantT;       /*  Time VC was last
desired */
    unsigned short     srv_mpxvc_MaxReq;          /*  Max outstanding
requests */
                                                  /*  allowed on session */
    unsigned short     srv_mpxvc_ReqAct;          /*  Number of active
requests */
    unsigned short     srv_mpxvc_PendReqCnt;      /*  Number of excess
requests */
    unsigned short     srv_mpxvc_LongReq;         /*  Number long term
requests */
    unsigned short     srv_mpxvc_LongAsy;         /*  Number long term
asyncs */
    unsigned short     srv_mpxvc_AsyCloses;       /*  # asyn closes being
waited for */
    /* @d07 begin */
    unsigned short     srv_mpxvc_mpxcount;        /*  counter to keep out raw r/w */
    /* @d07 end */
    unsigned short     srv_server_Time;           /*  server's current time
*/
    unsigned short     srv_server_Date;           */  server's current date
*/
    unsigned short     srv_server_TZone;          */  server's time zone */
    struct VC          srv_mpxVC;                 */  multiplexed VC info
*/
    struct VC          srv_fftVC;                 /*  Fast File Transfer VC
info */
    unsigned short     srv_CryptPwdLen;           /*  Used to detect the
case of */
                                                  /*  NO crypt key (ie no
*/
                                                  /*  encr. to be done)
```

-continued

```
        unsigned char      srv_CryptPwd[CRYPT_TXT_LEN];   /*  Cryptography Pwd */
                                                          /*  returned in
NEGOTIATE */
/*.errnz  ( srv_PassWdLen - 2 - ( srv_SessPass + PWLEN+1 ) ) */
        unsigned char      srv_SessPass[PWLEN+1];         /*  Session Passwd.
PlainText */
        unsigned short     srv_PassWdLen;                 /*  Used for Size info */
        unsigned char      srv_SessPassP[SESSION_CRYPT_KLEN];
                                                          /*  Encrypted Sess
Password */
        unsigned char      srv_EncrPass[SESSION_PWLEN];
                                                          /*  Dbly Encrd Sess
Password */
        unsigned char      srv_EncrDefPw[SESSION_PWLEN];
                                                          /*  Sess PassWd encrypted
with */
                                                          /*  Default Key at Neg
time. */
        unsigned char      srv_MAC_SessPass[PWLEN+1];     /*  @d10
*/
        unsigned short     srv_MAC_PassWdLen;             /*  @d10
*/
        unsigned char      srv_MAC_SessPassP[SESSION_CRYPT_KLEN];  /*  @d10
*/
        unsigned char      srv_MAC_EncrPass[SESSION_PWLEN];  /*  @d10
*/
        unsigned char      srv_MAC_EncrDefPw[SESSION_PWLEN];  /*  @d10
*/
        unsigned short     srv_mcid;                      /*  Machine ID, RIPL boot
or PermConn case */
        unsigned short     srv_uid;                       /*  User ID, returned by
server*/
        unsigned char      srv_uflag;                     /*  whether user is
logged on */
        /* @f01 begin */
        unsigned char srv_misc_flags; /* created this to define a new
flag */
                                                          /*  to indicate whether this is a
DCE */
                                                          /*  server connection. */
        unsigned short srv_cm_cb;                         /*  convenient place to put pointer
to */
                                                          /*  cm_cb. This is the offset of
the cb,*/
                                                          /*  and valid only on
CM_connect1/2,              */
                                                          /*  and CM_disc commands to the CM.
*/
        /* @f01 end */
     };    /* srv_list */
/* srv_flags Masks */
#define SRV_INVALID            0x0001    /*  Session exists, but is zapped
*/
#define SRV_WAITING            0X0002    /*  PROC(S) waiting on srv_list
*/
#define SRV_DISCONNECTED       0x0004    /*  srv_list disconnected from
server */
#define SRV_BADFW              0x0008    /*  Passwd which once was good
now bad */
#define WAIT_TO_GO_RAW         0X0010    /*  waiting to use VC in RAW mode
*/
#define TOGGLE_BIT             0x0020    /*  wake raw, toggle, wake mpx
etc. */
#define SRV_XENIX              0x0040    /*  Ok to ssend mixed case passwd
*/
#define SRV_RIPL               0x0080    /*  It is associated with RIPL */
#define SRV_NEED_LOGON         0x0100    /*  need to do session setup
protocol */
#define SRV_LOGON_BUSY         0x0200    /*  session setup in progress */
#define SRV_NOACKINTR          0x0400    /*  A NoAck send was interrupted
*/
#define SRV_RAWREQ             0x0800    /*  A raw request is outstanding
*/
#define SRV_GUESTLOGON         0x1000    /*  logged on as guest */
#define SRV_NEED_NULLLOGOFF    0x2000    /*  Need to log off Null User */
#define SRV_NULLUSR            0x4000    /*  Null User Session */
/* WARNING: Numerical Value for SRV_NULLUSR must equal that for\
```

-continued

```
RTCB_NULLUSR */
#define SRV_INIT            0x8000              /*  session being established */
/* @f01 begin */
/* srv_misc_flags Masks */
#define SRV_DCE_CONN        0x01                /*  If this flag is on, the
connection */
                                                /*  was established to a DCE \
server,  */
                                                /*  and we must notify the
credentials */
                                                /*  manager if the connection is
*/
                                                /*  terminated. See changes for
feature*/
/* @f01 end */
/* Defines for srv_SecMode */
#define SRV_USER_LEV     1      /* User Level security flag           */
#define SRV_ENCR_PWD     2      /* PassWd Encryption support flag     */
#define SRV_SECPX        4      /* LS Enterprise server flag          */
/* @f01 end */
/* defines for OptSup */
#define RAWREAD          0x01   /* Raw Block Read supported (OptSup)  */
#define RAWWRITE         0x02   /* Raw Block Write supported (OptSup) */
#define SUBDIAL          0x04   /* Sub Dialect supported (OptSup)     */
/* Defines for srv_uflag (One Byte) */
#define SRV_USER_LOGGEDON   0x01  /* User is logged on */
#define SRV_MCLOGGEDON      0x02  /* Machine is logged on */
```

The present invention provides numerous advantages over the prior art. As has been described, the invention allows for the creation of persistent network connections that survive logoff and that, therefore, persist across logon. It allows a service daemon (e.g., NET.EXE) to modify an existing connection to a network device to make the connection "permanent", thus preventing the connection's imminent destruction. Of course, if desired, the connection can be deleted explicitly.

The mechanism also enables the establishment of a security context for each particular persistent network connection that differs from the user's logged on user id and password. Further, the mechanism automatically reconnects these network connections (in the presence of network failure) with the correct security context. Moreover, the mechanism enables applications (such as service daemons) to have application specific security contexts (userid/password) that can be used to connect to their devices.

Another advantage of the present invention is that the network connections may be hidden from the standard NET USE service daemon list. If desired, the mechanism may limit the ability of a user to enumerate, add, delete or modify a persistent connection unless the user exhibits some local administrator authority. One of ordinary skill in the art also will appreciate that the invention may be extended to limit the ability of others (i.e. excepting the local administrator) from opening files or viewing data on a persistently-connected network drive.

As previously mentioned, the inventive persistent connections mechanism is implemented in software residing on the client machine. The inventive functionality is preferably implemented within or as an adjunct to a network redirector module of a network operating system. The given functions described above thus may be implemented as a set of instructions (program code) in a code module resident in the random access memory of the computer. Until executed by the computer's processor, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network.

In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

As used herein, the term "server" should also be broadly construed to mean a computer, computer platform, an adjunct to a computer or platform, or any component thereof. Of course, a "client" should be broadly construed to mean one who requests or gets the file, and "server" is the entity which downloads the file.

Having thus described our invention, what we claim as new and desire to secure by letters patent is set forth in the following claims.

What is claimed is:

1. A method for managing persistent network connections to network devices, comprising the steps of:
   following user logon, designating a selected network connection as persistent;
   saving a security context associated with the selected network connection, wherein the security context optionally differs from a security context associated with the user logon;
   responsive to a given network event, using the saved security context to manage the selected network connection.

2. The method as described in claim 1 wherein the given network event terminates the selected network connection.

3. The method as described in claim 2 wherein the saved security context is used to facilitate reestablishment of the selected network connection.

4. The method as described in claim 1 wherein the given network event is a transient interruption of the selected network connection.

5. The method as described in claim 4 wherein the saved security context is used to reconnect the user to the network device transparently.

6. The method as described in claim 1 wherein the given network event is a user logoff.

7. The method as described in claim 6 further including the step of ignoring the selected network connection during processing of the user logoff.

8. The method as described in claim 1 wherein the network device is selected from the group of devices consisting essentially of drives, printers, modems and named pipes.

9. The method as described in claim 1 further including the step of deleting the selected network connection at a later time.

10. The method as described in claim 1 wherein the selected network connection is a previously-established network connection that is modified to be designated as persistent.

11. The method as described in claim 1 further including the step of validating a user's authority to manage persistent connections prior to the designating step.

12. A method for managing persistent network connections to network devices, comprising the steps of:

designating selected network connections as persistent;

responsive to a network event that ordinarily terminates a network connection, determining whether the network connection is persistent; and if the network connection has been designated persistent, maintaining network resources needed to maintain the persistent network connection.

13. The method as described in claim 12 wherein a persistent network connection is maintained for a selected network device and the step of determining comprises examining a device type modifier for the selected network device.

14. A method for managing persistent network connections to network devices, comprising the steps of:

designating selected network connections as persistent;

responsive to a network event that ordinarily terminates a network connection, determining whether the network connection is persistent;

if the network connection has been designated persistent, maintaining network resources needed to maintain the persistent network connection;

in the event of a network failure in which network connections cannot be maintained, upon restart of the network, determining a set of persistent network connections to be restarted;

determining a security context for each of the set of persistent network connections; and restarting each of the set of persistent network connections with an appropriate security context.

15. The method as described in claim 14 further comprising the steps of:

determining whether a user was currently authenticated for a given persistent network connection before network failure; and if so, allowing access to the network connection without requiring further authentication.

16. The method as described in claim 12 wherein the network device is selected from the group of devices consisting essentially of drives, printers, modems and named pipes.

17. A computer program product in a computer-readable medium for managing network connections in a client machine, comprising:

means for designating selected network connections as persistent;

means responsive to a network event that ordinarily terminates a network connection for determining whether the network connection is persistent; and means responsive to the determining means for maintaining network resources needed to maintain the persistent network connection.

18. The computer program product as described in claim 17 wherein a persistent network connection is maintained for a selected network device and the means for determining comprises means for examining a device type modifier for the selected network device.

19. A computer program product in a computer-readable medium for managing network connections in a client machine, comprising:

means for designating selected network connections as persistent;

means responsive to a network event that ordinarily terminates a network connection for determining whether the network connection is persistent;

means responsive to the determining means for maintaining network resources needed to maintain the persistent network connection;

means for determining and saving a security context for each of the set of persistent network connections; and means for restarting each of the set of persistent network connections with an appropriate security context.

20. A computer program product in a computer-readable medium for managing network connections in a client machine, comprising:

means for designating selected network connections as persistent;

means responsive to a network event that ordinarily terminates a network connection for determining whether the network connection is persistent; and means responsive to the determining means for maintaining network resources needed to maintain the persistent network connection, wherein the network device is selected from the group of devices consisting essentially of drives, printers, modems and named pipes.

21. A client connected to a computer network having a set of servers that support network devices, comprising:

a processor;

an operating system;

a network redirector; and means cooperating with the network redirector for establishing and managing persistent connections, comprising:

means for designating selected network connections as persistent;

means responsive to a network event that ordinarily terminates a network connection for determining whether the network connection is persistent; and means responsive to the determining means for maintaining network resources needed to maintain the persistent network connection.

* * * * *